United States Patent
Zagromski

(10) Patent No.: US 8,203,299 B2
(45) Date of Patent: Jun. 19, 2012

(54) MACHINE TOOL OR PRODUCTION MACHINE WITH SIGNAL GENERATION BY MEANS OF DIRECT DRIVE AND METHOD FOR GENERATING SIGNALS IN SUCH A MACHINE

(75) Inventor: Martin Zagromski, Wetter/Ruhr (DE)

(73) Assignee: Klingelnberg AG, Zurich (CH)

( * ) Notice: Subject to any disclaimer, the term of this patent is extended or adjusted under 35 U.S.C. 154(b) by 784 days.

(21) Appl. No.: 12/338,144

(22) Filed: Dec. 18, 2008

(65) Prior Publication Data
US 2009/0160388 A1    Jun. 25, 2009

(30) Foreign Application Priority Data
Dec. 19, 2007 (EP) .................................. 07 123 633

(51) Int. Cl.
*G05B 19/18* (2006.01)
(52) U.S. Cl. ......... 318/569; 318/570; 318/114; 318/119
(58) Field of Classification Search .................. 318/569, 318/570, 602, 606, 114, 119
See application file for complete search history.

(56) References Cited

U.S. PATENT DOCUMENTS

| | | | |
|---|---|---|---|
| 4,644,335 A * | 2/1987 | Wen | 340/683 |
| 4,707,688 A * | 11/1987 | Thomas | 340/680 |
| 4,831,365 A * | 5/1989 | Thomas et al. | 340/680 |
| 5,004,964 A * | 4/1991 | Kataoka et al. | 318/128 |
| 6,085,121 A | 7/2000 | Stern | |
| 6,229,234 B1 * | 5/2001 | Lambert et al. | 310/81 |
| 6,241,435 B1 | 6/2001 | Huang et al. | |
| 6,429,610 B1 * | 8/2002 | Russell | 318/114 |
| 7,005,810 B2 * | 2/2006 | Ueda et al. | 318/114 |
| 7,030,368 B2 * | 4/2006 | Strasser | 250/231.13 |
| 7,129,618 B2 * | 10/2006 | Fujimoto et al. | 310/316.01 |

FOREIGN PATENT DOCUMENTS

EP    0 165 482 A2    12/1985
EP    1 454 713 A2    9/2004

* cited by examiner

*Primary Examiner* — Walter Benson
*Assistant Examiner* — Thai Dinh
(74) *Attorney, Agent, or Firm* — McCormick, Paulding & Huber LLP

(57) ABSTRACT

Machine (10) with an NC control unit (11) and at least one motor (12) which can be triggered by said control unit (11) and which forms an oscillatory system with its bearing and/or parts of the machine (10). The control unit (10) injects control variables (S1) into the motor (12) which trigger a desired motion of the motor (12). When necessary, the control unit (11) additionally injects predetermined signal variables (S2) into the motor (12) which trigger desired mechanical oscillations of the oscillatory system. The signal variables (S2) are predetermined in such a way that the mechanical oscillations are audible and/or tangible.

17 Claims, 3 Drawing Sheets

MACHINE TOOL OR PRODUCTION MACHINE WITH SIGNAL GENERATION BY MEANS OF DIRECT DRIVE AND METHOD FOR GENERATING SIGNALS IN SUCH A MACHINE

CROSS REFERENCE TO RELATED APPLICATION

This application claims the benefit of European Application No. 07 123 633.5, filed Dec. 19, 2007, the disclosure of which is herein incorporated by reference in its entirety.

FIELD OF THE INVENTION

The invention relates to a machine tool or production machines with at least one direct drive and a method for operating such machines.

BACKGROUND OF THE INVENTION

Conventional spindle-nut systems in conjunction with rotating motors have partly been used until now in machine tools. In the last decade, the interest in the integration of so-called numerically controlled (NC) linear motors in machine tools has grown and there are a number of machines which use such linear motors. Linear motors allow describing a translatory motion directly, which is why they are also known as direct drives. There are also direct drives which produce a rotational motion.

The demands for speed and low cost at high precision and reliability that have been rising continuously for many years have established the increased application of linear motors generally in production and automation systems and robots. Production and automation systems as well as robots shall be subsumed herein under the term "machine" for the sake of simplicity.

There are also other types of numerically controlled (NC) actuators which are used in machines. The mentioned linear motors and actuators are all controlled by a numerical control. The control either feeds in electric currents or volume flows of fluids (hydraulic fluid) are pumped into the actuator.

The common aspect in all these systems is that the moved masses of the NC axes thus driven lead to an oscillatory system with the bearings of the linear motors or actuators and the fixed parts of the machine. Depending on the operating state, oscillations will occur in such systems. These oscillations are rather undesirable however and there are various developments whose goal it has been to avoid or reduce the oscillations.

In machines that are becoming increasingly more complex and larger, it has always been desirable despite the automation to provide the user with feedback. Screens with a graphic user interface are typically used on the one hand. On the other hand, additional acoustic signal generators are often used in order to emit a warning sound prior to the start-up of a machine. The machines are equipped with respective loudspeakers and a signal source which is preferably controlled by the machine's control unit. The technical effort required for this purpose in order to make the acoustic signals audible even when the machine is running can be relatively high.

So-called start-up warning devices are partly required under law which prior to the start-up of a machine mandatorily issue a clearly audible acoustic signal.

It is therefore the object to provide a signalling system for acoustic and/or tangible signals in a machine in order to send warnings for example. The signalling system shall be as cost-effective and sturdy as possible.

It is a further object to provide a respective method which can be used in machines in order to emit signals. In this context one goal is to improve work safety.

SUMMARY OF THE INVENTION

In accordance with the invention, electric and/or hydraulic drives (e.g. feeding or rotating drives) in production and automation systems (which are referred to herein generally as machines) are used. Especially linear motors (which are also known as linear synchronous motors or LSM), preferably permanent-magnet-excited linear synchronous motors and (DC) torque motors. The invention can also be applied to other electric actuators or hydraulic actuators.

A machine in accordance with the invention comprises an NC control and at least one motor which is directly driven and controlled by said control and which forms an oscillatory system with its bearing and/or parts of the machine. The control applies control variables to the motor which trigger a desired motion of the motor. Moreover, the control applies to the motor predetermined signal variables which trigger the desired mechanical oscillation of the oscillatory system, with the signal variables being predetermined in such a way that the mechanical oscillations are audible and/or tangible.

A method in accordance with the invention for generating audible and/or tangible signals is characterized in that a signal variable is generated by a control which shall trigger the desired mechanical oscillations of an oscillatory system, with a direct drive of the machine simultaneously being an excitation element and part of the oscillatory system. The signal variable is applied to the motor in order to initiate mechanical oscillation in the oscillatory system via the motor, with the mechanical oscillation being audible and/or tangible in the environment of the machine.

Advantageous embodiments of the machine in accordance with the invention and the respective method form the subject matter of the dependent claims.

BRIEF DESCRIPTION OF THE DRAWINGS

Embodiments of the invention are described in closer detail below by reference to the drawings, wherein.

DESCRIPTION OF THE PREFERRED EMBODIMENTS

Figure 1:
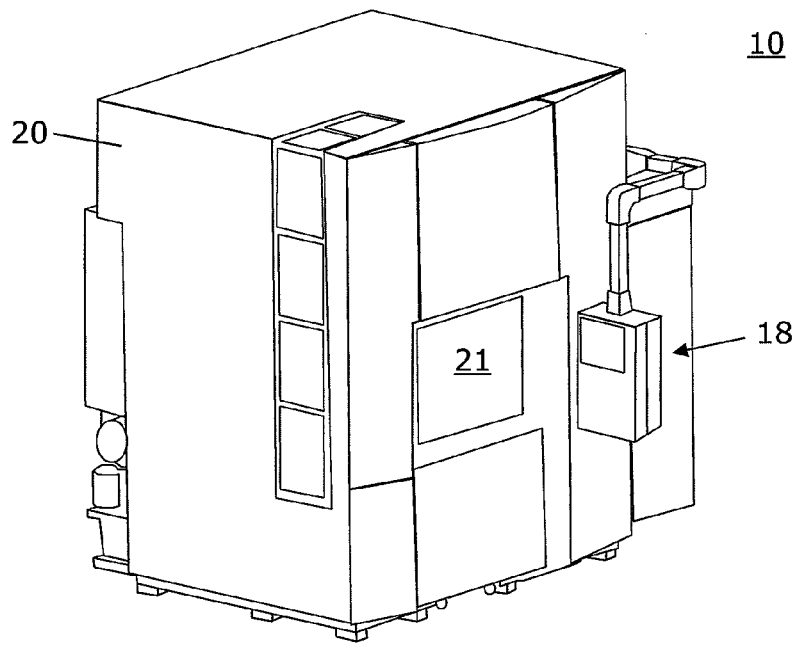
FIG. 1 shows a three-dimensional illustration of a machine in accordance with the invention.

Terms will be used in connection with the present description which are also used in relevant norms. Notice shall be taken however that the use of such terms shall serve the sole purpose of better understanding. The inventive idea and the scope of protection of the patent claims shall not be limited in their interpretation through the specific choice of the terms. The invention can simply be transferred to other systems of terms and/or special fields. Terms shall be applied by analogy in other special fields.

The invention shall be described below by reference to linear synchronous motors, with an analogous application easily being possible even in motors and actuators other than those mentioned above. The invention can also be used for example in connection with torque motors, as will be explained below by reference to an embodiment.

As in conventional rotational synchronous machines, a travelling field is generated in the linear synchronous motor by the injected currents which enables the motion of a runner (rotor). The place of generation depends on the constructional design of the linear synchronous motor. When a long-stator drive is concerned, the generation of the travelling field occurs in the stator. The runner (rotor) consists of an electric or permanent magnet and follows the travelling field synchronously. In the case of a short-stator linear motor, the generation of the travelling field occurs in the runner (rotor). The guide bar (i.e. the stator) consists in this case of an electric or permanent magnet. In the case of a short-stator drive which is arranged in a relatively simple way, it is necessary to transfer the electric power onto the runner (rotor). Friction-free bearing of the runner (rotor) on the stator is ensured by electromagnetic levitation. Electromagnetic levitation is based on the attractive or repulsive forces of a magnetically excited iron circuit.

A linear motor or torque motor, as well as the other motors and actuators mentioned initially, forms a dynamic system with reproducible oscillation properties. This dynamic system is generally referred to herein as an oscillatory system. Especially the bearing of the motor and/or parts of the machine contribute to the oscillation behavior of the oscillatory system. Especially machines which are in direct mechanical connection with a machine bed, a machine cover (shell) or the like are suitable for generating audible or tangible oscillations. Motors have proven to be especially reliable which are part of a pivoting, feeding or (tool or workpiece) spindle drive. Preferred embodiments of the invention relate to such motors which are in direct mechanical connection with a machine bed, machine cover (shell) or the like, with motors of pivoting, feeding or spindle drives being preferable.

The invention provides a special control which provides specially shaped input signals (or fluid volume flows in the case of hydraulic drives) for a directly driven motor (or actuator). Such input signals are referred to herein generally as signal variable S2. The control variables which trigger a motion (e.g. translatory motion) of the motor are designated with the term control variable S1 in contrast to signal variable S2. The signal variables S1 concern actuating or closed-loop control variables which are provided by an NC control (preferably an NC control with converter).

The signal variable S2 leads to a purposeful excitation of oscillations of the motor. Simple and robust control algorithms are predetermined according to a preferred embodiment of the invention and used in the control (preferably in a signal generator) (e.g. realized in hardware) which ensure stability and good performance of the motor on the one hand and generate tangible and/or audible (oscillation) signals by means of the motor on the other hand.

In accordance with the invention, a clear distinction is made between productive controlled motions of the motor and sound-producing (unproductive) motions (oscillations) of the motor, its bearing and the ambient machine parts (called oscillatory system). Both processes are decoupled substantially on the control side (see FIG. 4 for example). The control of the motor by the NC control for generating productive motions occurs like in conventional machines by predetermining special control variables S1. Said productive motions can be superimposed at any time with an (unproductive) motion (mechanical oscillation) of the motor. The oscillations can also be generated according to the invention when the motor does not perform any productive motion.

A respective control for operating a motor is generally known. The motion state (angular measurement) or the position of the motor (positional measurement) is determined via a sensor for generating productive motions for example and the respective information is supplied to the control which operates the motor depending on the difference between setpoint and actual value of the motor parameters by applying control variables S1. Time-changeable default values such as position, speed or acceleration can be maintained in this manner in a relatively precise way.

At the same time or in addition, the control in accordance with the invention or an electronic module or circuit which is linked to the control generates the desired signal variables S2. Preferably, these signal variables S2 are generated or output depending on the respective situation.

The following shows a number of situations in which an audible or tangible signal could be emitted by the motor of a machine:
In the transition from automatic (NC controlled) operation to a semi-manual or manual operation;
During the maintenance of the machine if the service staff is situated within the machine. The motor can emit a (warning) signal prior to executing a motion command for example;
If one of the motors is overloaded or if excessive heat development has been detected;
If a tool should be worn out, an acoustic service call can be emitted through a motor of the machine;
As a start-up warning prior to start-up of the machine.

The list is not an exhaustive list, but is merely a listing of a number of examples which indicate how flexible the invention is and in how many different situations it can be used.

The following shows a number of examples of signals which could be emitted by a motor of a machine in accordance with the invention:
Warning sound;
Start-up warning
Overload notice;
Acknowledgement signal after a programming input;
Function signal in order to successively go through the proper functioning (reaction capability) of the individual motors in an acoustic manner;
Voice signal as a warning or command for example;
Anti-sound signal in order to blank out disturbing acoustic signals of the motor or the machine.

This listing also only concerns examples. This list too is not exhaustive.

FIG. 1 shows a machine 10 which is equipped with the invention. It concerns a CNC controlled hobbing cutter (e.g. Oerlikon C 29) for producing bevel gears. Machine 10 represents a gearing system for bevel gear and hypoid bevel gear transmissions by using the bevel gear hobbing cutter, offering the preconditions for producing helical gear pinions and ring gears in individual and series production. Machine 10 comprises a housing 20 (cover) with an inspection window 21 which allows monitoring the production process. An operational control unit 18 is arranged on a pivoting arm which is connected with an NC control unit 11 (not shown). Machine 10 is equipped with an NC control unit 11 which allows driving several axes simultaneously. Programming of the control unit 11 can occur in dialog via a screen and the keys of the operational control unit 18 or via a network connection.

Figure 2:
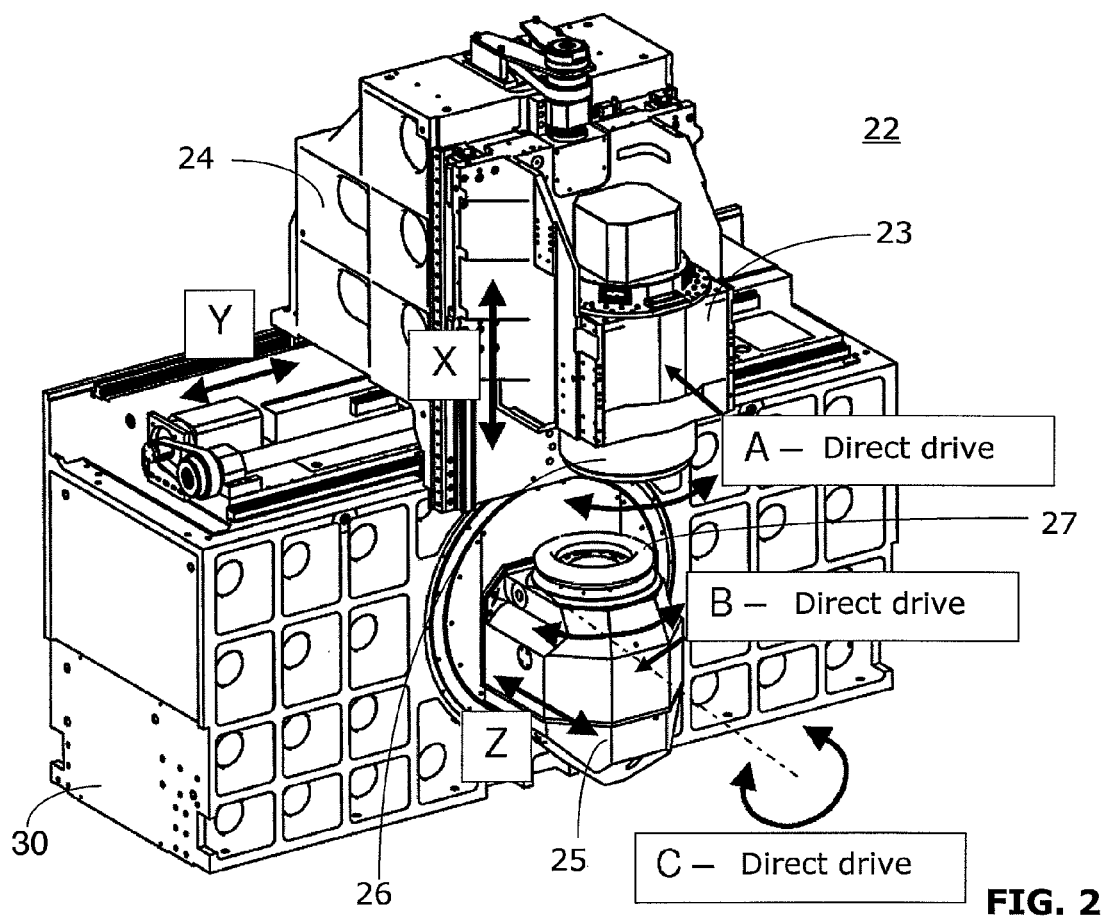
FIG. 2 shows a three-dimensional illustration of the inside structure of the machine in accordance with the invention.

FIG. 2 shows the inside arrangement 22 of machine 10. The illustrated machine has six NC-controlled axes: X-axis, Y-axis, Z-axis, A-axis, B-axis and C-axis. The X-axis allows a vertical upward and downward displacement of a tool carriage 23. The Y-axis allows a horizontal displacement of a carriage 24 which carries the tool carriage 23. The Z-axis allows the tool holder 25 to move into and out of a horizontal y-z plane. In the illustrated example, the A-axis (tool spindle axis) comprises a direct drive which makes the tool 26 rotate about the vertically standing A-axis. Machine 10 further comprises a B-axis (tool spindle axis) with a direct drive which makes the workpiece 27 rotate about the vertically standing B-axis. The A and B axes extend parallel with respect to each other. A rotation about the C-axis is enabled by a further direct drive. As is indicated in FIG. 2, the tool holder 25 plus workpiece 27 can be tilted by rotation about the C-axis.

The A direct drive sits directly above the tool 26 and drives the tool spindle. The B direct drive sits directly beneath the workpiece 27 and the workpiece spindle. The C direct drive sits in the interior of the machine bed 30.

Figure 3:
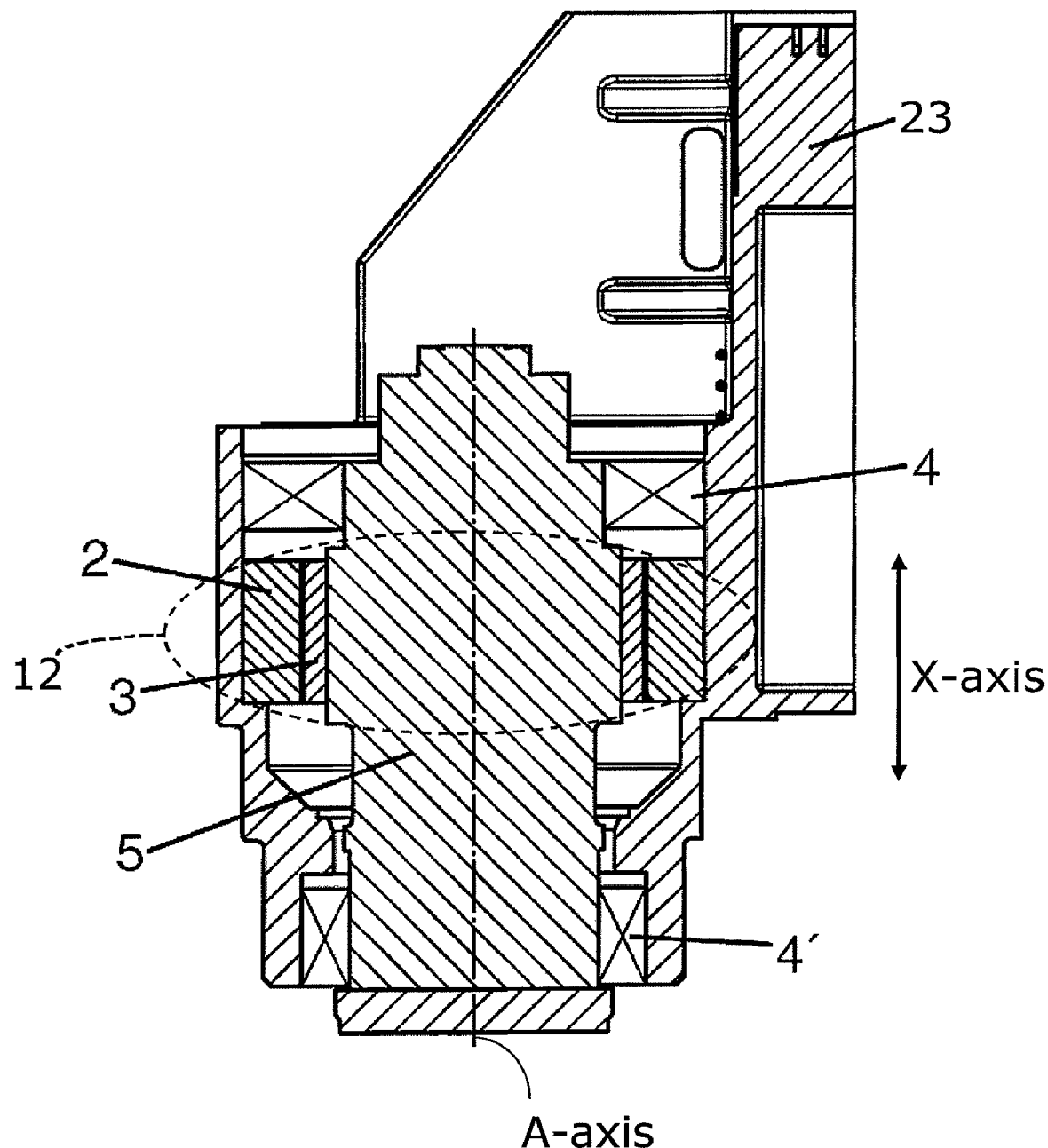
FIG. 3 shows a schematic sectional view of a tool spindle with direct drive, as can be used in a machine in accordance with the invention.

FIG. 3 shows a schematic sectional view of an A direct drive. The tool spindle is designated with reference numeral 5. It comprises an A-axis which extends parallel to the X-axis. The tool (not shown) can rotate about said A-axis. The tool carriage 23 can be seen on the right side in FIG. 3. The stator 2 of a torque motor 12 and the rotor 3 of said torque motor are arranged in a concentric manner about the tool spindle 5. When the torque motor 12 is supplied with a control variable S1 which is provided by the control unit 11, motor 12 rotates the tool spindle 5 about the A-axis. The position of the motor 12 is indicated in FIG. 3 by an oval shown in a broken line. Tool spindle 5 is held in the shown example by two radial bearings 4, 4'. Said radial bearings 4, 4' produce a mechanical connection between the tool spindle 5 and the remaining parts of machine 10. This mechanical connection is also used as an acoustic coupling and forms an oscillatory system with the parts of machine 10.

Figure 4:
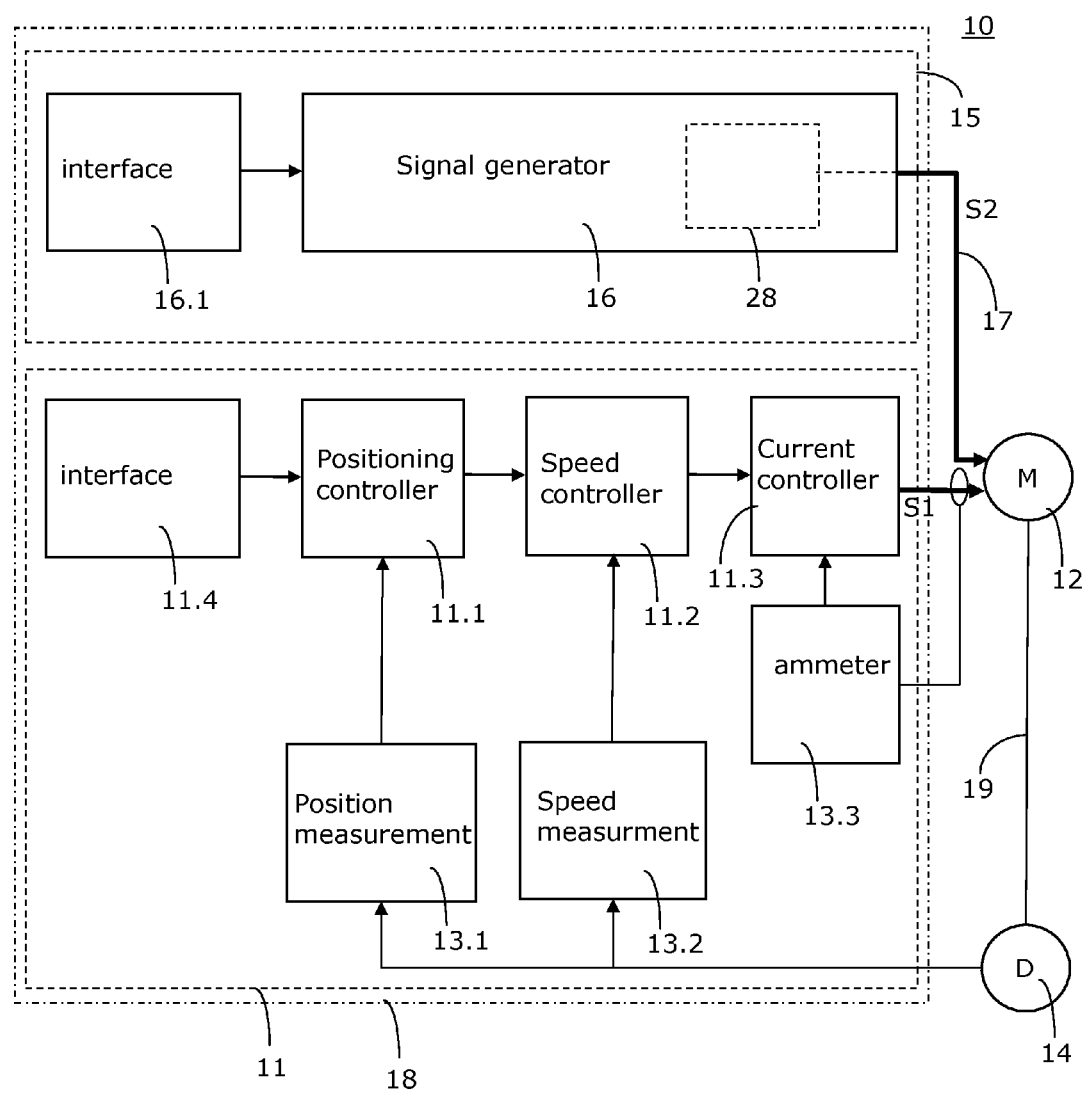
FIG. 4 shows a schematic block diagram of an NC control of a direct drive, as can be used in a machine in accordance with the invention.

FIG. 4 shows a possible embodiment of the electric/electronic part of a machine 10. FIG. 4 shows a motor (M) 12 (e.g. the torque motor according to FIG. 2) of a machine 10 plus a control unit 11 (servo control). Control unit 11 drives motor 12 which is part of a direct drive system. Motor 12 is fed with a control variable S1 (e.g. respective currents), as is indicated by a thick arrow. The respective control variable S1 is generated in the illustrated embodiment by a number of controllers 11.1, 11.2 and 11.3. The positioning controller 11.1 and the speed controller 11.2 are each provided with a respective measuring unit 13.1, 13.2 which receive measurement signals from a rotary encoder (D) or angle encoder 14. The rotary encoder (D) or angle encoder 14 is coupled in a mechanical, optical or capacitive way with the motor 12, as is indicated by the connecting line 19. The current controller 11.3 becomes feedback from an ammeter 13.3. which measures the current S1 (which is also known as control variable), as indicated in FIG. 4.

Both the current control 11.3, speed control 11.2, and positioning control 11.1 can be realized digitally. The closed-loop controls 11.1, 11.2, 11.3 can also be realized in an analog way.

The interface 11.4 receives control commands (e.g. in the form of machine data) from a computer that is not shown. These control commands are converted by the control unit 11 into positioning control variables and/or rotational control variable.

A signal source 15 is shown above the control unit 11 which generates the signal variable S2. Signal source 15 comprises a signal generator 16 (e.g. sine-wave generator) with integrated amplifier for example. Signal variable S2 together with the signal variable S1 is applied via an output 17 to the input of the motor 12, i.e., the signal variable S2 is superimposed on the control variable S1 and then injected into motor 12.

Both the signal source 15 as well as the control unit 11 can have interfaces 16.1 or 11.4 in order to be connected with a computer for example. The interface 16.1 of the signal source 15 can be connected with a source for example which predetermines a data file or sound file. The data file or sound file predetermines audible or tangible mechanical oscillations, with the signal source 15 of control unit 11 converting the data file or sound file into signal variables S2. If a suitable data file or sound file is predetermined, one does not need a sine-wave generator in the signal generator 16, but an amplifier of the signal generator 16 can generate signal variables S2 directly.

Control unit 11 or the signal source 15 preferably comprises a filter (e.g. a filter 28, as indicated in FIG. 4) which filters out the signal variables S2 which might make the oscillatory system enter into critical self-resonance. Preferably, a resonance filter will be used.

In a preferred embodiment, filter 28 is adjustable or programmable. This allows setting the filter 28 for each direct drive in such a way that self-resonance(s) of the respective direct drive can be suppressed or avoided successfully. Since each direct drive forms a different oscillatory system as a result of its bearing 4, 4' and/or as a result of parts of machine 10 that enclose the same, an adjustment or programming can successfully suppress or avoid self-resonance(s).

NC control unit 11 ensures a controlled triggering of motor 12, so that it can perform productive movements in a precisely controlled manner. Preferably, the NC control unit 11 forms a position-controlled electric direct drive in combination with motor 12. Both closed-loop current, speed and position control can be realized in a digital manner, as already mentioned. Irrespective of whether the system concerns a permanent-magnet-excited synchronous or asynchronous motor, a so-called vector-oriented or field-oriented closed-loop control is preferably used as a part of the control unit 11. Said control unit 11 preferably comprises on the output side a converter system for triggering the motor 12. Preferably, the converter system comprises a voltage-source converter.

A machine in accordance with the invention can be referred to as being optimal when it meets application-specific requirements such as mass, stiffness and damping and the desired oscillation properties such as natural frequencies, amplitudes and fading times. One can optimize the entire machine accordingly by so-called sound engineering (acoustic tuning). This optimization of the machine parameters which requires heavy computing can be performed by means of a finite element calculation for example.

In accordance with the invention, (non-critical) resonances (resonance frequencies) of the motor can intentionally be used in order to produce loud sounds or clearly tangible oscillations. The problem in operating a motor in the resonance range is however that large motion amplitudes are produced which can lead to fatigue and reduction in precision. This embodiment is therefore not preferable when machines are concerned where precision plays a role. In order to avoid critical self-resonances, a filter 28 can be used, as already described above.

According to a preferred embodiment of the invention, the control unit 11 should be configured and arranged in such a way that performance and stability of the direct drive are guaranteed while desired oscillation signals are generated.

Preferably, the control unit 11 is arranged as an intelligent control which always ensures that the productive controlled motion of motor 12 takes precedence over sound-producing (unproductive) motions (mechanical oscillations) of motor 12. When machining a workpiece for example, the mechanical oscillations might lead to imprecision in the production. That is why in such a case the oscillations would be suppressed or preferably sent to another motor 12 of machine 10. A respective intelligent control unit 11 may comprise a switching element for example which interrupts line 17 when necessary (so that momentarily no interfering oscillation occurs), or that the line 17 with the signal variable S2 conducts to another direct drive which is currently not productive.

An embodiment of the invention is especially preferred which comprises a kind of "intelligent selector". This selector chooses the motor 12 of machine 10 whose productive load is not influenced by the injection of the signal variables S2 or is influenced to the least extent thereby. Since each of the motors 12 forms a separate oscillatory system on the basis of its installation situation, three different signal variables S2, S2\* and S2" must be predetermined for three motors for example, so that all three motors are in the position to emit the same (or close to the same) signal sound.

A software-controlled tuning of the individual motors can occur on each of the machines 10 in accordance with the invention. Preferably, machine 10 will be provided for this purpose with acoustic sensors or such measuring structureborne sound. A signal variable S2 is then predetermined which shall generate a specific signal sound. This is followed by an automatic comparison between actual value and setpoint value and the signal variable S2 will be changed until the desired signal sound has been reached. The entire machine 10 can thus be tuned. This tuning of the machine 10 can be repeated from time to time because changes may occur in the course of operations.

The control unit 11 can have remote access via ethernet for example in addition to the usual bus interfaces like Profibus, CAN-bus and Interbus. A machine 10 or a group of machines in a company network can be integrated via such an (ethernet) interface (e.g. interface 11.4). The predetermination of the signal variables S2 can thus principally be checked from any PC. The users are thus offered the possibility to access all control units 11 of a production unit in a convenient manner from their PCs.

In accordance with the invention, a number of different sensors can be used for detecting the mechanical oscillations, which are wire strain gauges, laser diode modules and PSDs (position sensitive devices), piezoelectric elements as structural actuator/sensor, acceleration sensors, etc. By using such sensors, a closed-loop control system can be established which supplies feedback to the control unit 11. It can thus be ensured that a warning sound was truly emitted.

It is the task of the electric motors 12 in the NC-controlled machine axes to implement the setpoint torque required by the drive controller (control unit 11) in a manner that is as free as possible from distortion and delay. This implementation shall be independent from the signal generation in accordance with the invention.

The invention claimed is:

1. Numerically controlled machine tool or production machine (10) with an operational control unit (18) comprising a numerical control unit (11) and a signal source (15), the numerically controlled machine tool or production machine (10) further comprising at least one numerically controlled motor (12) which can be triggered by said numerical control unit (11), is used as a direct drive and forms with its bearing (4, 4') and/or parts of the machine (10) an oscillatory system, with the numerical control unit (11) providing the numerically controlled motor (12) with control variables (S1) which trigger a productive controlled motion of the numerically controlled motor (12), characterized in that the signal source (15) of the operational control unit (18) provides the numerically controlled motor (12) with predetermined signal variables (S2) which cause the desired mechanical oscillations of the oscillatory system, with the signal variables (S2) being predetermined in such a way that the mechanical oscillations are audible and/or tangible as acoustic and/or tangible signals.

2. Numerically controlled machine tool or production machine (10) according to claim 1, characterized in that the control variables (S1) and the signal variables (S2) are provided to the numerically controlled motor (12) simultaneously, with the numerically controlled motor (12) performing the desired motion while the oscillatory system oscillates.

3. Numerically controlled machine tool or production machine (10) according to claim 1, characterized in that the motor (12) concerns a numerically controlled motor (12) which can be driven electrically and the control variables (S1) and signal variables (S2) concern electric currents.

4. Numerically controlled machine tool or production machine (10) according to claim 3, characterized in that the control variables (S1) and the signal variables (S2) are superimposed before they are provided to the numerically controlled motor (12).

5. Numerically controlled machine tool or production machine (10) according to claim 3, characterized in that the machine (10) concerns a numerically controlled machine tool or production machine which emits audible or tangible mechanical oscillations as a signal in predetermined situations.

6. Numerically controlled machine tool or production machine (10) according to claim 1, characterized in that the operational control unit (18) comprises filters (28), preferably a resonance filter, which filters out signal variables (S2) which would induce self-resonance in the oscillatory system.

7. Numerically controlled machine tool or production machine (10) according to claim 1, characterized in that a data file or sound file can be provided to the operational control unit (18) which predetermines the audible or tangible mechanical oscillations, with the operational control unit (18) converting the data file or sound file into signal variables (S2).

8. Numerically controlled machine tool or production machine (10) according to claim 1, characterized in that signal sounds and/or sounds can be generated by means of the operational control unit (18) and the oscillatory system.

9. Numerically controlled machine tool or production machine (10) according to claim 1, characterized in that audible voice signals can be generated by means of the operational control unit (18) and the oscillatory system.

10. Method for generating audible and/or tangible signals in a numerically controlled machine tool or production machine (10) which comprises an operational control unit (18) comprising a numerical control unit (11) and a signal source (15), the machine 10 further comprising a numerically controlled motor (12) which can be controlled by said numerical control unit (11) and which forms an oscillatory system with its bearing (4, 4') and/or parts of the machine (10 comprising the steps of:

generating signal variables (S2) by the signal source (15) of the operational control unit (18) which are to trigger desired mechanical oscillations of the oscillatory system;

providing the signal variables (S2) to the numerically controlled motor (12) in order to induce mechanical oscillations in the oscillatory system via the numerically controlled motor (12), with the mechanical oscillations being audible and/or tangible in the vicinity of the machine (10).

11. Method according to claim 10, characterized in that a data file or a sound file can be predetermined in a further step, with the operation control unit (18) converting the data file or sound file into the signal variables (S2).

12. Method according to claim 11, characterized in that the operational control unit (18) uses filters (28) in generating the signal variables (S2) which filter out the signal variables (S2) which would induce self-resonance in the oscillatory system.

13. Method according to claim 10, characterized in that the machine (10) comprises sensors in order to supply feedback to the operational control unit (18), with the operational control unit (18) generating predetermined mechanical oscillations in certain states of the machine (10).

14. Method according to claim 10, characterized in that data files and/or sound files can be predetermined to the machine (10) in a preparatory step.

15. Method according to claim 10, characterized in that the machine (10) can be programmed in a preparatory step by means of a user interface with
signal sounds, and/or
sounds, and/or
audible voice signals.

16. Method according to claim 15, characterized in that the operational control unit (18) can be connected to a storage medium in which the signal sounds and/or sounds and/or audible voice signals are predetermined.

17. Method according to claim 10, characterized in that the machine (10) comprises a switching element or selector in order to supply the signal variables (S2) to numerically controlled motor (12) which does not work productively at the moment.

\* \* \* \* \*